Oct. 12, 1937.  J. G. SHIVELY  2,095,893
SOLDERING IRON
Filed Sept. 17, 1936
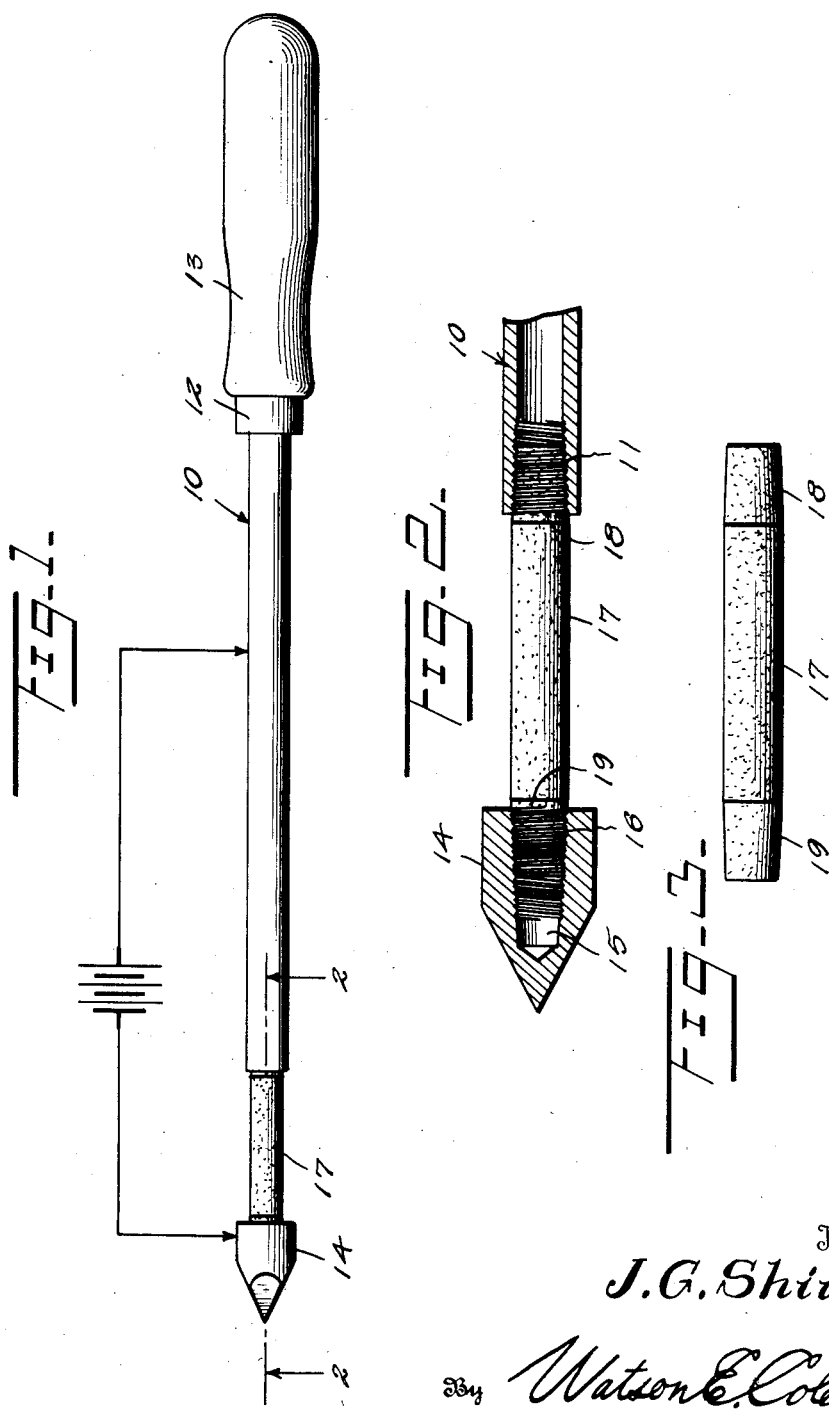
Inventor
J. G. Shively
By Watson E. Coleman
Attorney Patented Oct. 12, 1937

2,095,893

UNITED STATES PATENT OFFICE 2,095,893

SOLDERING IRON

Jacob G. Shively, Millmont, Pa.

Application September 17, 1936, Serial No. 101,312

1 Claim. (Cl. 219—26)

This invention relates to soldering irons and more particularly to an electrically heated soldering iron.

An object of this invention is to provide a soldering iron which is adapted to be heated by electricity but which is so constructed that it may be connected to a source of electric current supply such as a battery or the like by merely touching the iron to the poles of the battery so as to short the current between the poles which will have the effect of heating a heating element carried by the iron after which the iron may be removed from the battery poles and used in the normal way.

Another object of this invention is to provide an iron of this character which is exceedingly simple in construction and which has a readily replaceable heating element which is so constructed that as the heating element becomes corroded or burnt away at the points of contact with the other parts of the iron the heating element may be brought into contact with the other parts of the iron so as to provide a firm contact therewith.

With the foregoing and other objects in view, the invention will be more fully described hereinafter, and will be more particularly pointed out in the claim appended hereto.

In the drawing, wherein like symbols refer to like or corresponding parts throughout the several views:—

Figure 1 is a detailed side elevation of an iron constructed according to an embodiment of this invention showing diagrammatically the manner of connecting the iron with a source of electric current supply;

Figure 2 is a sectional view taken on the line 2—2 of Figure 1;

Figure 3 is a detailed side elevation of the heating element used with this iron.

Referring to the drawing, the numeral 10 designates generally an elongated rod which may be hollow throughout the length thereof or which may be hollowed out at its forward end and provided with interior threads 11. The rear end of the rod 10 is provided with a handle 13 which is of non-conducting material and a ferrule 12 may engage about the forward end of the handle so as to hold this handle tightly upon the rod or tubular member 10. A soldering head 14 which is provided with an interior bore 15 having threads 16 is disposed forwardly of the tubular member 10 and this head 14 is preferably constructed of copper, brass or the like and is pointed in the usual manner so that it may be used to perform the necessary soldering operations.

An elongated stick 17 is interposed between the tubular member 10 and the head 14 and this stick 17 is preferably constructed of carbon or like conducting material which is adapted to become heated to a relatively high degree so that the heat from this heating element 17 will be communicated to the head 14. The heating element or stick 17 is provided with tapered opposite end portions 18 and 19 which are adapted to be threaded into the forward end of the tubular member 10 and the threaded bore 15 of the head 14 respectively.

In the use of this iron, the tubular member 10 is adapted to be connected to one side of a source of electric current supply and where a storage battery is available, this tubular member 10 may be placed in contact with one pole of the battery and the head 14 may be placed in contact with the other pole of the battery. The iron may be held on the two poles of the battery for a short period of time until the heating element 17 becomes heated to a point where this element will glow, whereupon the iron may be removed from the battery so that the heat from the heating element will thereby be communicated to the head 14. In the event the head 14 does not become heated to the desired degree on one application of the device to the battery, the iron may be applied to the poles of the battery a second time and the iron then removed when the heating element 17 is heated to the proper degree. When the head 14 has been properly heated, the iron may be used in the normal manner for soldering purposes.

If desired and in the event it is not convenient to cross or short circuit the two poles of the battery, a wire may be engaged with the tubular member 10 connecting this member 10 with one side of a source of current supply and a second wire then connected to the source of current supply on the opposite side and connected to the head 14. The usual procedure of heating the element 17 to the desired degree may be followed where wires are connected to the conducting member 10 and to the head 14.

With the use of this iron, it is possible to perform soldering operations at the points where it is not convenient to use an electrically operated soldering iron which requires current using the normal voltage in the house or building. In other words, this iron may be used about a vehicle by short-circuiting the poles of the storage battery or if this is not convenient, the tubular holder 10 may be contacted with the frame of the machine which is grounded to one side of the battery and then the head 14 may be placed in contact with the opposite pole of the battery. It will be apparent from the foregoing that an exceedingly simple soldering iron has been disclosed which can be used about a motor vehicle for small soldering operations and as the tapered ends 18 and 19 of the heating element become worn through burning out, these ends may be turned up into the holder 10 and into the head 14 so as to form new contacts with the threads of these members.

This heating element 17 is preferably relatively short and when this element becomes worn to the degree where it will not properly heat the head 14, it may be easily replaced with a new heating element.

It is, of course, understood that various changes and modifications may be made in the details of construction and design of the above specifically described embodiment of this invention without departing from the spirit thereof, such changes and modifications being restricted only by the scope of the following claim.

I claim:—

A soldering iron comprising a tubular metallic holder, threads at one end of the holder, a handle fixed to the opposite end of the holder, a metallic soldering head disposed in forwardly spaced relation to the holder, said head being provided with a bore opening through one end thereof, interior threads in said bore, and a carbon heating element interposed between the holder and the head, said holder having tapered opposite end portions threadably engaged within the holder and the bore of the head and supporting the head in forwardly spaced relation to the holder, the threads of said head cutting threads into said heating element upon movement of said heating element thereinto.

JACOB G. SHIVELY.